United States Patent [19]

Coffey et al.

[11] Patent Number: 5,445,243

[45] Date of Patent: Aug. 29, 1995

[54] ARROW LUBRICATION SYSTEM

[75] Inventors: B. Howard Coffey, LaGrange; Gary L. Coffey, Glendale, both of Ky.

[73] Assignee: Coffey Marketing Corporation, Crestwood, Ky.

[21] Appl. No.: 154,930

[22] Filed: Nov. 19, 1993

[51] Int. Cl.⁶ ............................................. F01M 1/00
[52] U.S. Cl. .................................... 184/102; 184/109; 220/229; 273/416; 206/315.11
[58] Field of Search ................ 184/102, 109, 88.1, 184/88.2, 10, 14, 16, 19, 22, 25, 64; 220/229; 273/416, 419, 420; 118/100, 270; 224/148, 916; 206/315.11

[56] References Cited

U.S. PATENT DOCUMENTS

| | | | |
|---|---|---|---|
| 1,567,111 | 12/1925 | Burr | 184/109 |
| 2,213,465 | 9/1940 | Gay | 220/229 |
| 2,654,109 | 10/1953 | Barnes | 118/100 |
| 4,948,009 | 8/1990 | Sawatani | 220/229 |

*Primary Examiner*—Edward K. Look
*Assistant Examiner*—Christopher Verdier
*Attorney, Agent, or Firm*—Middleton & Reutlinger; David W. Carrithers

[57] ABSTRACT

A portable lubricant system for use in connection with sport bow shooting where arrows are shot into simulated figures and where it is necessary to quickly and efficiently remove the arrows from the figure without damage to the arrow. A casing is provided and holds an absorbent medium which receives the liquid lubricant to prevent loss of the liquid from the casing. A septum type lid allows insertion and removal of the arrow into the medium and removal of the lubricated arrow for use and limiting devices can be provided to adjust the length of extent of insertion of the arrow into the enclosure.

3 Claims, 3 Drawing Sheets

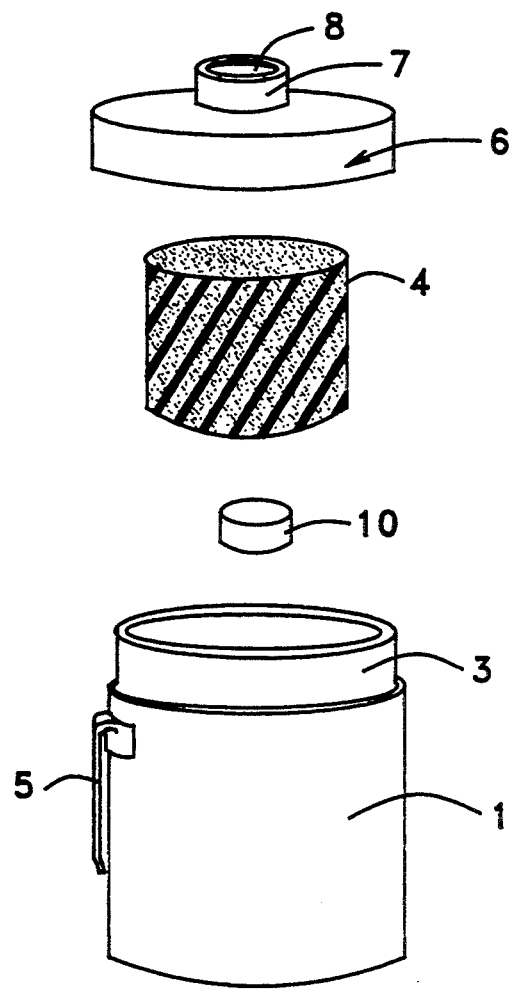
FIG. 1
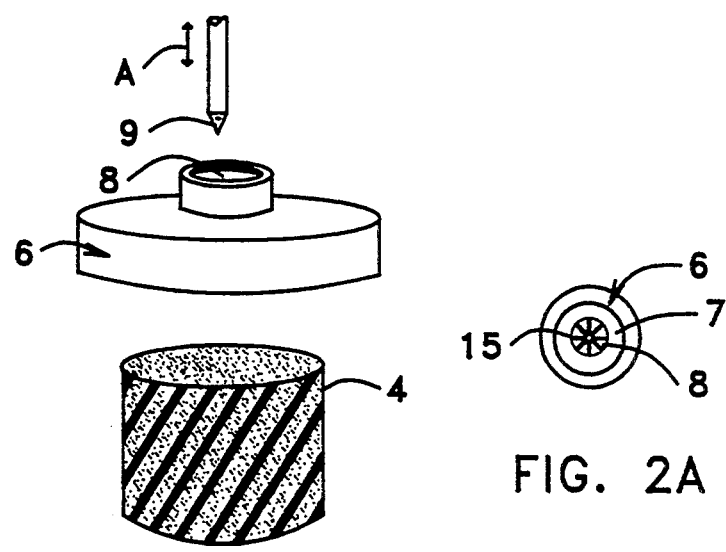
FIG. 2
FIG. 2A

ARROW LUBRICATION SYSTEM

CROSS-REFERENCE TO RELATED APPLICATIONS

There are no related applications STATEMENT AS TO RIGHTS TO INVENTIONS MADE UNDER FEDERALLY SPONSORED RESEARCH AND DEVELOPMENT The invention disclosed and claimed herein was not made under any Federally sponsored research and development program.

BACKGROUND OF THE INVENTION

The present invention relates to sport arrow lubrication and particularly to holder means for easy and efficient lubrication of arrows prior to shooting.

Sport shooting has developed to the state where simulated animals such as deer, bear etc. are located in various areas and the shooter must seek out the animal and shoot at it from a specified area. The shooter's performance is then graded on the accuracy of his shot.

Arrows used in sport shooting are expensive and only few can be carried at one time so it is vital that the arrows be recovered from the simulated animals undamaged. Even though the arrows are designed for easy release, the materials of construction of the simulated animals generally hold the arrows securely. Because of the cost of the animals and other factors it is important that the arrows be recovered from the animals with as little damage to the simulated animal as possible. The simulated animals must be sturdy to withstand numerous hits as well as the elements so cannot be made of materials which easily release the arrows.

It has been discovered that the use of lubricants such as glycols or other similar materials applied to the arrows immediately prior to shooting facilitate release of the arrow without damage to the arrow or the simulated animal.

Since the lubricant is most effective when applied immediately before shooting it is necessary for the shooter to carry a supply of the material in the field. However, the use of such lubricants has been complicated by the need for an effective means to carry a supply of the material in a manner which it can be easily and quickly applied.

Apparatus currently available for carrying and applying the material is generally messy and slow.

No effective means is known to be currently available for field application of lubricant to arrows during a hunting session.

SUMMARY OF THE INVENTION

The present invention provides a new and novel means for lubricating arrows used for sport shooting at targets. While the principal use of devices within the scope of the present invention may be for use when shooting simulated animal targets, commonly called 3D shooting, devices within the scope of the present invention are also useful in lubrication of arrows for shooting other targets.

Devices within the scope of the present invention are very effective and allow the lubrication of an arrow immediately prior to shooting without requiring the shooter to break concentration. Likewise, devices within the scope of the present invention are versatile because of the means used to retain the lubricant in the enclosure and they can be located by a variety of means to suit the style of the shooter.

Moreover, devices within the scope of the present invention can be economically fabricated so they can be made available at reasonable cost.

More particularly the present invention provides portable lubricant systems for use in connection with sport bow shooting where arrows are shot into targets such as simulated animal figures and where it is necessary to quickly and efficiently remove the arrows from the figure without damage to the arrow. A casing is provided and holds an absorbent medium which receives the liquid lubricant to prevent loss of the liquid from the casing. A septum type lid allows insertion and removal of the arrow into the medium and removal of the lubricated arrow for use and limiting devices can be provided to adjust the length of extent of insertion of the arrow into the enclosure.

Examples of arrangements within the scope of the present invention are illustrated in the accompanying drawings and described hereinafter but it will be understood that neither the accompanying illustrations nor the descriptions thereof are by way of limitation and that other arrangements also within the scope of the present invention will occur to those skilled in the art upon reading the disclosure set forth hereinafter.

BRIEF DESCRIPTION OF THE DRAWINGS

Examples of arrangements within the scope of the present invention are illustrated in the accompanying drawings wherein:

FIG. 1 is a perspective exploded view of one example of an arrangement within the scope of the present invention;

FIG. 2 is an exploded view similar to FIG. 1 illustrating the operation for lubrication of an arrow;

FIG. 2A is a plan view of an example of a top of a device useful in accordance with the present invention;

DETAILED DESCRIPTION OF THE PREFERRED EMBODIMENT

Figure 3:
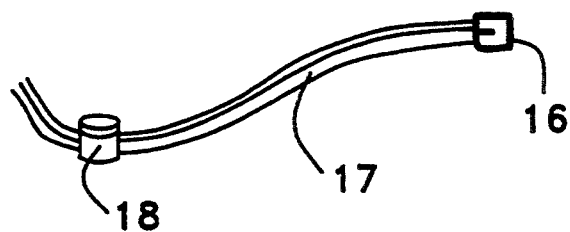
FIG. 3 is an illustration of an example of a device within the scope of the present invention retained on a belt to be worn by the user of the device.

FIG. 1 illustrates one example of a portable lubricant system within the scope of the present invention for use in connection with sport bow shooting, for example where arrows are shot into simulated figures and where it is necessary to quickly and efficiently remove the arrows from the figure without damage to the arrow.

In the example of FIG. 1 a casing 1 is provided and holds an absorbent medium 4 such as a fibrous or open cellular material which receives the liquid lubricant, for example glycol, silicon or other material. The medium can be of selected size and usually will be sized to fit into the casing 1. The medium is provided to prevent loss of the liquid from the casing through spillage or by other means and allows generally unlimited movement without loss of the lubricant. A lid 6 having a guide flange 7 is provided which can be received on a cooperative inset lip 3 provided on casing 1. A flexible septum type cover 8 is provided to allow easy insertion and removal of the arrow for lubrication as shown in FIG. 2.

Figure 5:
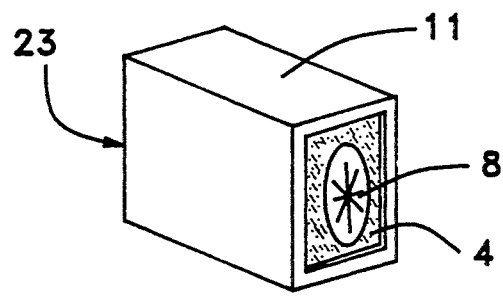
FIG. 5 is an illustration of another example of a device within the scope of the present invention.

As shown in FIG. 2 and 5 the septum cover can be slit so that it provides adequate cover for the casing to retain the liquid in the casing and further the segments 15 formed by splitting the flexible cover wipe excess lubricant from the arrow 9 as it is removed from the casing.

In accordance with another optional feature of the present invention a spacer 10 can be provided to be located in the casing to limit the depth of insertion of the arrow into the casing. Since arrows have varying length tips the use of a proper spacer can prevent contact of the arrow shaft with the lubricant where such contact may not be desirable and further conserves lubricant.

FIG. 3 illustrates one means of carrying the lubricant casing where a belt 17 to be worn by the shooter has a fastening device such as a buckle 16 and the belt receives a casing 18 similar to the casing of FIG. 1. The casing can be secured to the belt by any convenient means such as shown in the example of FIG. 1 where a belt clip 5 is provided. The clip is shown as a part of the lid 8 but it will be understood that within the scope of the present invention other arrangements can be used equally well.

Figure 4:
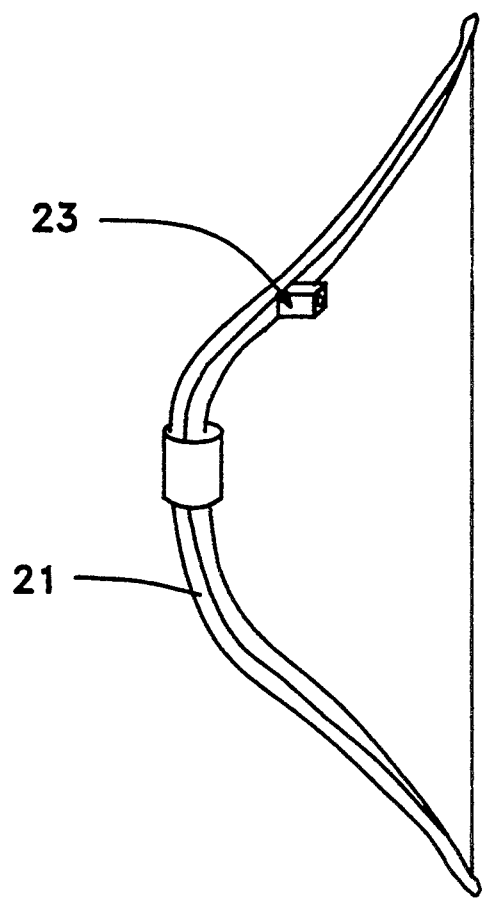
FIG. 4 illustrates a device within the scope of the present invention located on the bow of a shooter.

FIG. 5 illustrates yet another example of an arrangement within the scope of the present invention where casing 11 is provided with an open end covered by a flexible septum like cover such as described with reference to FIG. 1. Again the cover can be slitted to facilitate insertion and withdrawl of the arrow and to remove excess lubricant from the arrow. The example show in FIG. 1 can be made smaller than the example shown in FIG. 1 and in fact can be made small enough to be secured to the bow 21 itself above the grip as shown in FIG. 4 where the casing of the type shown in FIG. 5 is attached to the bow 21 and shown with reference numeral 23.

Figure 6:
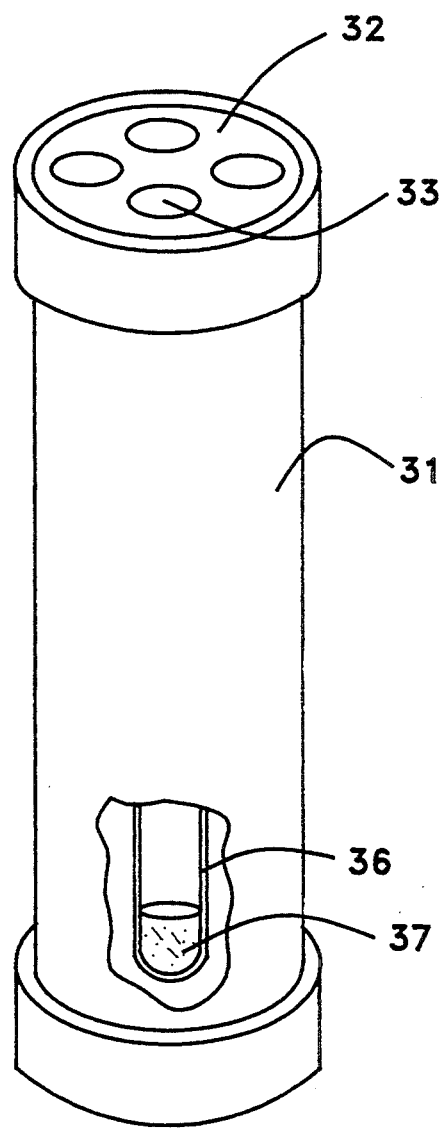
FIG. 6 is a perspective view of yet another example of an arrangement within the scope of the present invention.

FIG. 6 illustrates yet another example of an arrangement within the scope of the present invention where an arrow quiver 31 is shown having a cover 32 with openings 33. Each of the openings 33 receives a closed end tube 36 to receive an arrow. Within the scope of the present invention lubricant can be provided within the tube and a medium 37 of the typed previously described can be located in the tube to serve the purposes previously described.

It will be understood that a flexible cover of the type previously described can be provided over the tube opening.

It will be understood that the foregoing are but a few examples of arrangements within the scope of the present invention and that other arrangements also within the scope of the present invention will occur to those skilled in the art upon reading the disclosure set forth hereinbefore.

The invention claimed is:

1. A portable lubricant system to facilitate lubrication of an arrow tip and shaft including:
   casing means having an open end;
   resilient absorbent pad means to be received within said casing means so said arrow tip and shaft can be inserted into said absorbent pad means;
   liquid lubricant received by said absorbent pad means;
   lid means having septum means therein so that said arrow tip and shaft can be inserted therethrough into said absorbent pad means and removed therethrough for removal of excess lubricant from said arrow tip and shaft.

2. The invention of claim 1 wherein said septum means of said lid is slit into segments so that the segments engage said arrow shaft as it is removed from the casing.

3. A portable lubricant system to facilitate lubrication of an arrow tip and shaft including:
   casing means having an open end;
   resilient absorbent pad means received within said casing so said arrow tip and shaft can be inserted into said absorbent pad means;
   liquid lubricant received by said absorbent pad means;
   lid means having septum means therein so that said arrow tip and shaft can be inserted therethrough into said absorbent pad means and removed therethrough for removal of excess lubricant from said arrow shaft and limiting means in the bottom of said casing to limit the extent of insertion of said arrow tip and shaft into said casing.

* * * * *